(12) United States Patent
Cebulski (10) Patent No.: US 8,447,538 B2
(45) Date of Patent: *May 21, 2013

(54) APPARATUS AND METHODS FOR MONITORING QUANTITIES OF FLUID IN A CONTAINER

(76) Inventor: James Cebulski, Crown Point, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/346,267

(22) Filed: Jan. 9, 2012

(65) Prior Publication Data

US 2012/0109542 A1 May 3, 2012

Related U.S. Application Data

(63) Continuation of application No. 12/171,575, filed on Jul. 11, 2008, now Pat. No. 8,116,993.

(51) Int. Cl.
*G01F 17/00* (2006.01)

(52) U.S. Cl.
USPC ............................ 702/55; 702/45; 702/50

(58) Field of Classification Search
USPC ................. 702/45, 50, 55; 73/760, 861.52
See application file for complete search history.

(56) References Cited

U.S. PATENT DOCUMENTS

| | | | |
|---|---|---|---|
| 4,720,800 A | 1/1988 | Suzuki et al. | |
| 5,279,481 A | 1/1994 | Trotter et al. | |
| 5,299,141 A | 3/1994 | Hungerford et al. | |
| 5,351,725 A | 10/1994 | Suthergreen et al. | |
| 7,832,394 B2 | 11/2010 | Schechter et al. | |
| 8,116,993 B2 * | 2/2012 | Cebulski | 702/55 |
| 2010/0005903 A1 | 1/2010 | Beavis | |
| 2010/0331883 A1 * | 12/2010 | Schmitz et al. | 606/249 |

FOREIGN PATENT DOCUMENTS

| | | |
|---|---|---|
| FR | 1137186 | 5/1957 |
| GB | 2379991 | 3/2003 |
| WO | WO2006138464 | 12/2006 |

OTHER PUBLICATIONS

The PCT International Search Report and Written Opinion dated Aug. 6, 2009 corresponding to U.S. Appl. No. 12/171,575.
PCT/US2009/045890 International Preliminary Report on Patentability filed Feb. 6, 2009, mailed Jan. 20, 2011, pp. 1-7.

* cited by examiner

*Primary Examiner* — Elias Desta
(74) *Attorney, Agent, or Firm* — McAndrews, Held & Malloy, Ltd.

(57) ABSTRACT

The present technology relates to a volumetric measurement device and various methods for operation of the device. The device comprises at least one accelerometer for detecting the angle of tilt/tip of a container. The device also comprises at least one fluid property processor capable of providing at least one fluidic property value of a fluid, a flow-rate processor capable of continuously calculating the present flow rate of the fluid when poured from the container, and a volume processor capable of continuously calculating the present volume of the fluid within the container. The flow-rate processor calculates the rate of flow of the fluid poured from the container based on the angle of tilt/tip of the apparatus, the at least one fluid property value, and the present volume of fluid within the container.

20 Claims, 7 Drawing Sheets

Fig. 3 APPENDIX D VARIATION OF VISCOSITY WITH TEMPERATURE

DYNAMIC VISCOSITY VS. TEMPERATURE --SI UNITS

APPARATUS AND METHODS FOR MONITORING QUANTITIES OF FLUID IN A CONTAINER

RELATED APPLICATIONS

This application makes reference to, and claims priority to U.S. Non-Provisional application Ser. No. 12/171,575, filed on Jul. 11, 2008 by James Cebulski, titled "Apparatus And Methods For Monitoring Quantities Of Fluid In A Container," now U.S. Pat. No. 8,116,993, thereby incorporated by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present technology generally relates to one or more an apparati and methods for monitoring the quantity of fluid in a container. More specifically, the apparati relates to methods and devices that determine the quantity of fluid poured from a container in an enhanced precision manner based on the application of a mathematical algorithm to the angle of tilt of the container.

Monitoring the amount of fluid transferred between vessels is an important practice in operations that involve frequent transfer of fluids. Auto repair shops, laboratories, plants, and even kitchens are frequently measuring the amount of fluid transferred between containers. For example, a chemical production facility may need to transfer a portion of fluid (e.g., one gallon) from a 55-gallon storage drum into a mixer, preferably in a precise manner.

Typically, to transfer the desired amount of fluid, a user is required to first pour the fluid into a separate measuring container, such as a graduated measuring cup or other volume measuring container, so that the appropriate amount of fluid can be separated. Then, the fluid is transferred from the measuring container into the desired location completing a two-or-more-step process.

Such conventional measuring processes are undesirable for several reasons. First, the additional "transfer to an intermediate measuring container" step is inefficient as it takes more and labor and time than is ideal. The additional step also adds error to the measurement, providing an opportunity for spilling, over-pouring individual operator error, and multiple operator error. The additional step also requires the use of another vessel or container, which may need to be cleaned between uses, tared properly, and takes up space, thus adding clutter to a work environment. Additionally, the viscosity of fluids inevitably causes the fluid to stick to the walls of the measuring container, in turn adversely affecting the accuracy of the overall measurement method its repeatability and precision of measurement.

As a result, there exists a need for one or more methods and apparati that measure the volume of fluid poured directly from one container to another, without the use of, for example, a second step, or a third measuring container that overcomes one or more of the undesirable outcomes noted above.

BRIEF SUMMARY OF THE INVENTION

Certain embodiments of the present technology present a volumetric measurement device, comprising at least one accelerometer for detecting the angle of tilt of a container. The device also comprises at least one fluid property processor capable of providing at least one fluidic property value of a fluid, a flow-rate processor capable of continuously calculating the present flow rate of the fluid when poured from the container, and a volume processor capable of continuously calculating the present volume of the fluid within the container. The flow-rate processor calculates the rate of flow of the fluid poured from the container based on the angle of tilt of the container, the at least one fluid property value, and the present volume of fluid within the container.

Certain embodiments present methods for measuring the volume of fluid poured from a container. The method comprises providing a monitor comprising an accelerometer and at least one processor and attaching the monitor to the container at a location about the tipping axis of the container. Next, the method involves tilting the container along the tipping axis and measuring the angle of tilt using the monitor. The method also comprises continuously calculating the present volume of fluid remaining in the container relative to the angle of tilt, and continuously calculating the rate of flow of fluid poured from the container based at least on the angle of tilt and the present volume within the container.

Certain embodiments present a fluid storage system for monitoring the volume of fluid poured from a container. The system comprises a container capable of storing a fluid and a pouring monitor attached to the container. The monitor comprises an accelerometer detecting the angle of tilt of the container and a fluid property processor providing at least one fluid property value of the fluid in the container. The monitor also has a flow-rate processor continuously calculating the present rate of flow of fluid poured from the container; and a volume processor for continuously calculating the present volume of fluid within the container. The flow-rate processor of the monitor calculates the rate of flow of the fluid poured from the container based on the angle of tilt of the apparatus.

DETAILED DESCRIPTION OF THE INVENTION

The present technology describes volumetric measuring devices and methods for monitoring the volume of fluid transferred from, and remaining in, a container. For example, a container, such as a 55-gallon drum, may contain an initial volume of fluid. Over time, the fluid may be poured from the drum to various other containers, vessels or to other locations. Certain embodiments of the present technology present a monitor for calculating the volume of water transferred from, and remaining, for example, within a 55-gallon drum based on the angle of tilt of the drum.

Figure 1:
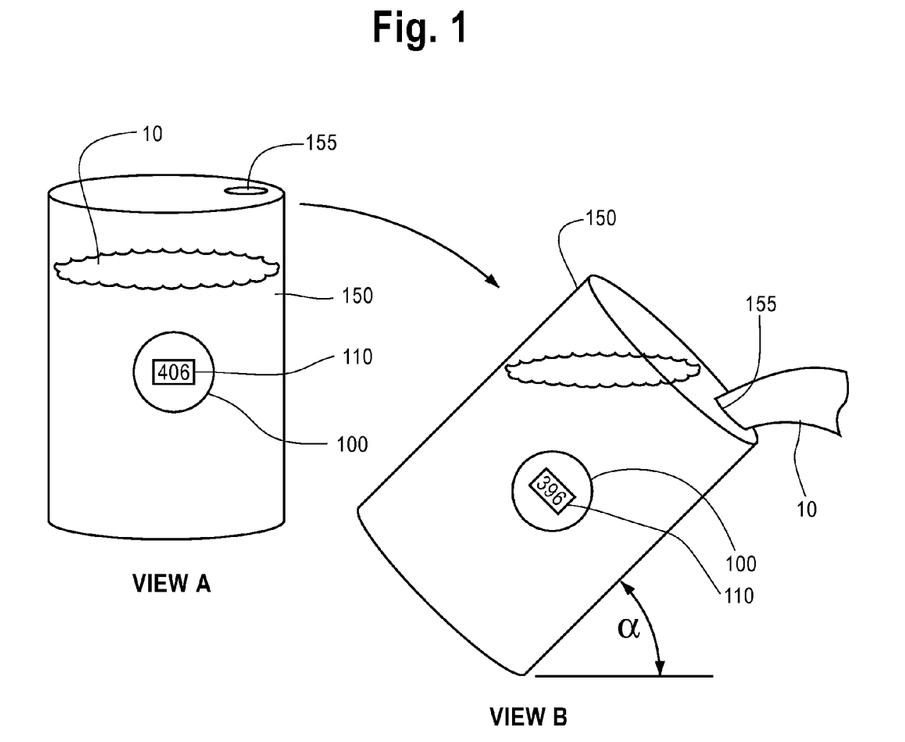
FIG. 1 depicts a volumetric fluid measuring device attached to a container in accordance with at least one embodiment of the present technology.

FIG. 1 depicts an embodiment of a monitor 100 monitoring the volume of fluid in a container 150. In View A of FIG. 1, the monitor 100 is attached to a container 150 holding a particular volume of fluid 10. A display 110 on the monitor 100 depicts a present value of volume of fluid within the container ("40 G", or 40 gallons in View A). As the container is tipped at an angle of tilt, $\alpha$, as shown in View B of FIG. 1, the fluid 10 pours out of the container 110, through a hole 155, which may be a bunghole, a spout, valve or other suitable orifice known in the art for allowing the flow of fluid to pass out of the container 150. The monitor 100, monitors the volume of fluid 10 poured from the container 150, based at least upon the angle of tilt $\alpha$, and modifies the value of display 110 (39 G, or 39 gallons in View B) based, in part, thereon.

Figure 2:
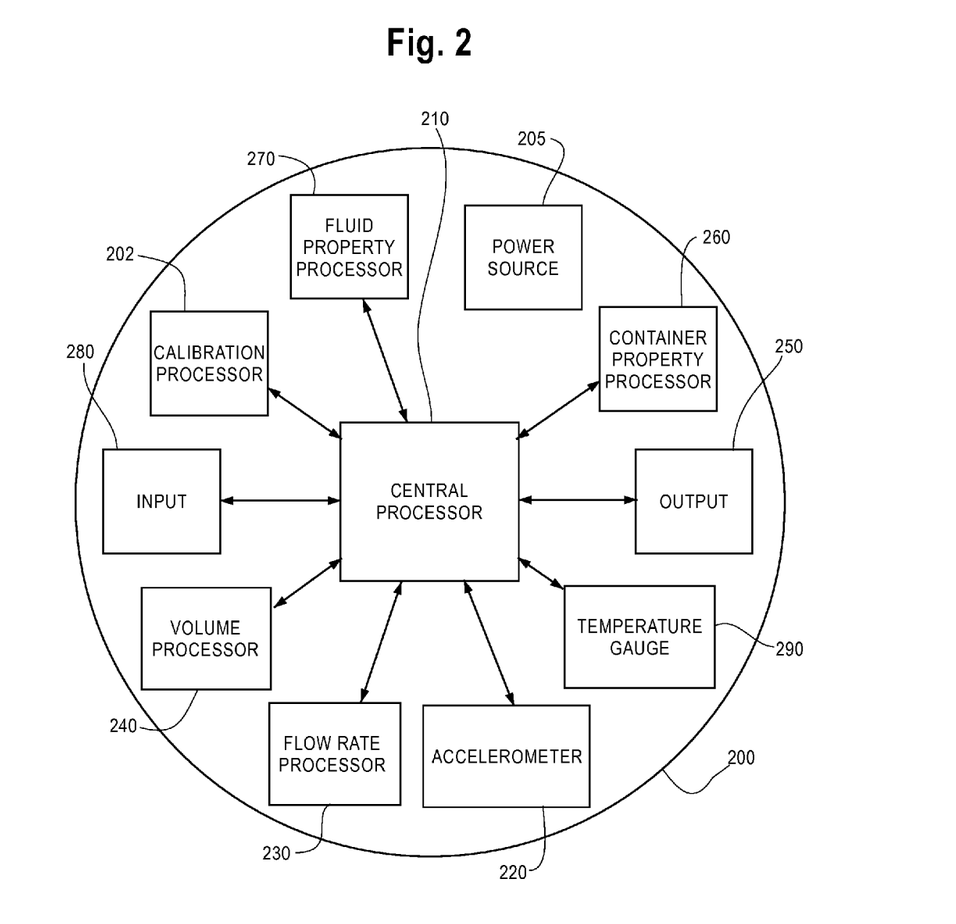
FIG. 2 depicts a diagram of various components of a volumetric fluid measuring device in accordance with at least one embodiment of the present technology.

FIG. 2 depicts a schematic diagram of the internal operations and the various components of a volumetric measuring monitor 200 in accordance with at least one embodiment of the present technology. A power source 205 provides the power to operate all elements of the monitor. The power source may be, for example, a battery or batteries installed into the monitor, or the power source may be a source of alternating current, such as a 12 volt power supply.

A central processor 210 regulates the operations of all components of the monitor 200. An accelerometer 220 measures the changes in acceleration of the monitor. As the monitor is tilted or tipped, the accelerometer 220 may detect the angle of tilt (i.e., tip) based upon the changes of acceleration, or gravitational pull, and the position of the accelerometer. Alternatively, the accelerometer 220 may generate a signal based on the degree of tilt and transmit the signal to the central processor 210 where the tilting angle is calculated.

Figure 3:
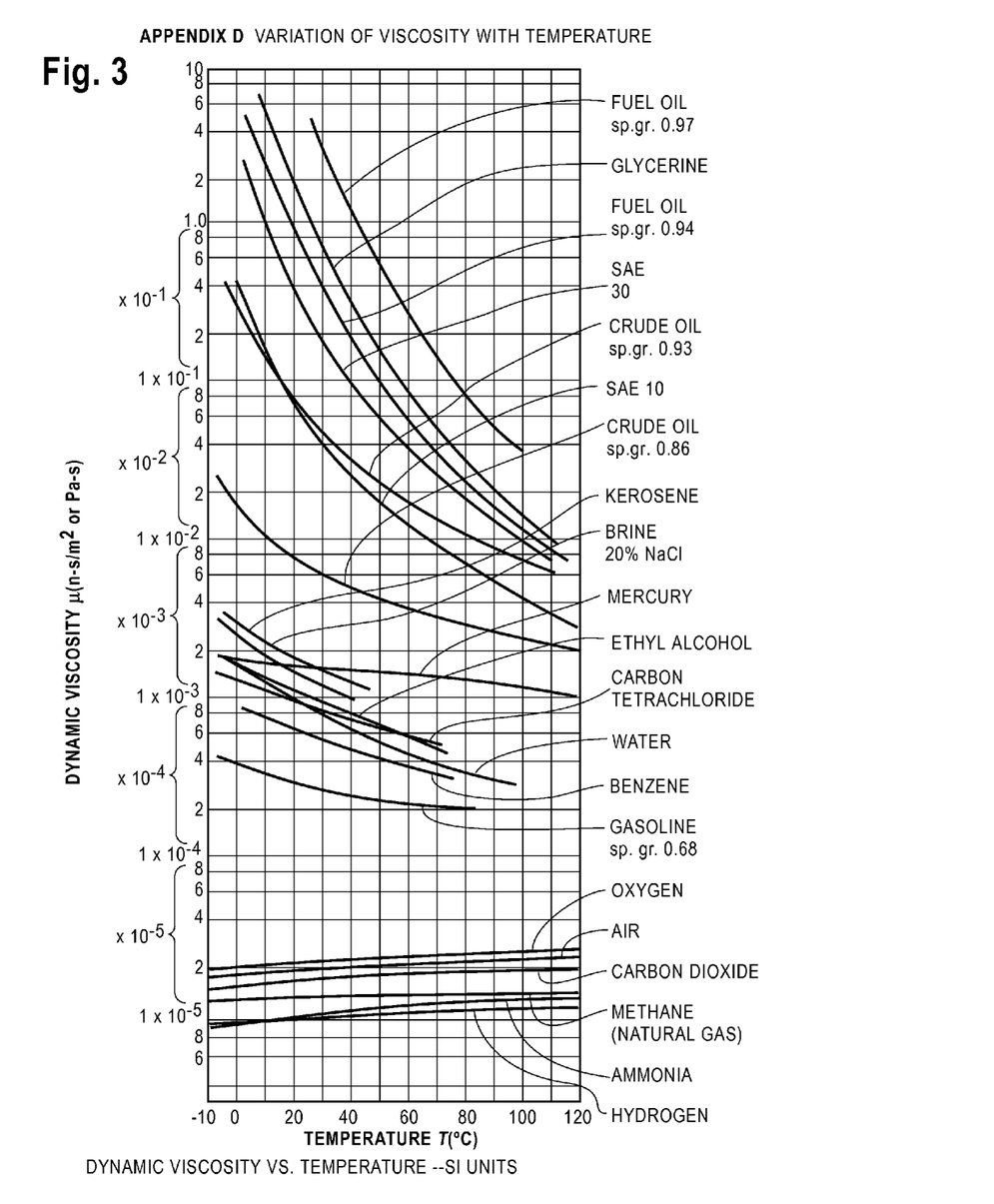
FIG. 3 depicts a graph showing the relationship between dynamic viscosity and temperature for a variety of fluids.

A fluid property processor 270 generates values for the properties of the fluid in the container. The fluid property processor 270 may be pre-programmed with certain values for a particular fluid, such as water, for example. The fluid property processor 270 may be programmed with values such as fluid density, fluid viscosity (kinematic viscosity and/or dynamic viscosity), fluid specific gravity, fluid conductivity, the specific heat of the fluid, the thermal diffusivity of the fluid, the thermal expansion coefficient of the fluid, the Prandtl number associated with the fluid, or any other value which may factor into the flow rate of the fluid. In certain embodiments, the fluid property processor 270 interacts with a temperature gauge 290 on the monitor 200 that detects the temperature of the ambient to modify the fluid property values in accordance with a change in the ambient temperature. For example, where the fluid in the container is water, and the temperature gauge detects an increase in the ambient temperature, the fluid property processor will generate new values for fluid properties such as density, and viscosity. FIG. 3 depicts a chart depicting the relationship between temperature and the dynamic viscosities of various fluids. Accordingly, data such as the data of FIG. 3 may be pre-programmed into the fluid property processor 270 and used to dynamically modify the fluid property values of the fluid as it changes with respect to a change in ambient conditions.

In certain embodiments, the monitor 200 may be designed exclusively for use in one type of fluid, for example, water. In such embodiments, the fluid property processor may provide one set of fluid property values that operate with the central processor 210 to generate the appropriate volumetric flow calculations.

The rate of flow of fluid into and out of the container depends in part on the container type. For example, water will flow out of a 55-gallon container at a different flow rate than it will flow out of a one gallon container, even when both containers are tilted at the same angle, and have the same initial volume. Accordingly, certain embodiments of the present technology provide a container property processor 260 that provides values for the physical properties of the container holding the fluid. For example, the container property processor 260 may provide values for the size and dimensions of the container, the material of the container, the size and location of the hole at which point the fluid is poured from the container, the ventilation properties of the container, or any other value which may affect the rate of flow of fluid from the container. The container property processor may be pre-programmed with the container properties for a variety of pre-stored container types. For example, the container property processor 260 may provide the container properties for a standard 55-gallon drum, a standard sized can of paint, a standard one-gallon milk jug, a five gallon bucket and a twenty gallon barrel. Depending on the container type selected by the monitor, the container property processor 260 will provide the appropriate corresponding container property values for the selected container type.

In certain embodiments, the monitor 200 may be designed exclusively for use in one type of container, for example, a 55-gallon drum. In such embodiments, the monitor may not have a container property processor. Instead, the monitor 200 will generate the volume of fluid in the container based on the container property values for which the monitor 200 is designed to be used.

In certain embodiments, the monitor may comprise an input 280. The input may be in the form of a single button, or a keypad having multiple buttons allowing a user to enter information into the monitor device. In other embodiments, the input may be in the form of a receiver, receiving information input from a device external to the monitor. For example, the input may be a wireless signal receiver that receives signals transmitted from a computer, via the Internet. The receiver may also allow for electronic connections, such that the monitor can connect to a device such as a computer and download or input necessary information.

The input 280 allows a user to enter information into the monitor to be used to determine the volume of fluid within the container. For example, the input 280 may receive information pursuant to the initial volume of fluid within the container, the fluid property values and/or the container property values. In certain embodiments a user may select a fluid type and/or a container type from a pre-programmed list or lists of fluid types and/or container types, where each fluid type and container type has a pre-assigned fluid property and container property values, respectively. For example, a user may be provided a list for a variety of fluid types such as water, oil, paint, milk, honey, a variety of water-oil emulsions, salt, brake fluid, gasoline or any other fluid or substance that is capable of being poured from a container. Additionally, a user may be provided with a list for a variety of container types including, but not limited to, a 55-gallon drum, a 5 gallon bucket, a standard paint can, a standard gallon milk jug, and a ten gallon bucket. Each fluid type and container type will have a pre-assigned set of fluid property values and container property values, respectively, that will be provided by the fluid property and container property processors for use in determining the rate of flow of fluid out of the container.

The monitor may also have an output 250, such as the display 110 of FIG. 1. The output may display values generated by the monitor such as, for example, flow rate of fluid out of the container, volume of fluid poured since calibration, volume of fluid remaining in the container, the angle of tilt of the container, or the temperature of the ambient, for example. A user may control the display produced on the output 250 via the input 280. For example, the user may scroll through a variety of display options by pressing a button on the monitor device, and selecting that display using the input 280. In certain embodiments, the output 250 may be, for example, a transmitter sending data to a device exterior to the monitor. As a further example, where the monitor is intended to be used on a container that is poured using a forklift or other device where the operator doing the pouring is not able to read the monitor, the output transmitter may send a signal to a remote device that can display the necessary information to the operator.

In certain embodiments, a calibration processor 202 may be provided to calculate the initial volume of fluid in the container. To calibrate, or determine the initial volume of fluid in the container, a user may tilt/tip the container to the angle where fluid begins to pour from the container. Via the input 280, the user may instruct the calibration processor 202 to note the angle as the initial pour angle. With the tilt/tip angle information and knowledge of the container property values, the calibration processor can calculate the initial volume of fluid in the container. Depending on the container properties of the container used, different equations or algorithms may be applied by the calibration processor. For example, where the container selected is a 55-gallon drum, the calibration processor will apply different equations or algorithms to determine the initial volume than for where the container selected is a five gallon bucket, even where the angle of tilt/tip where fluid begins to pour is the same. Different containers will also require different volume calculations based on the dimensions and other physical properties of the container. The accuracy of the measured tilt/tip angle by the accelerometer also have an effect on the calculation of the total volume of fluid in the container.

Figure 4:
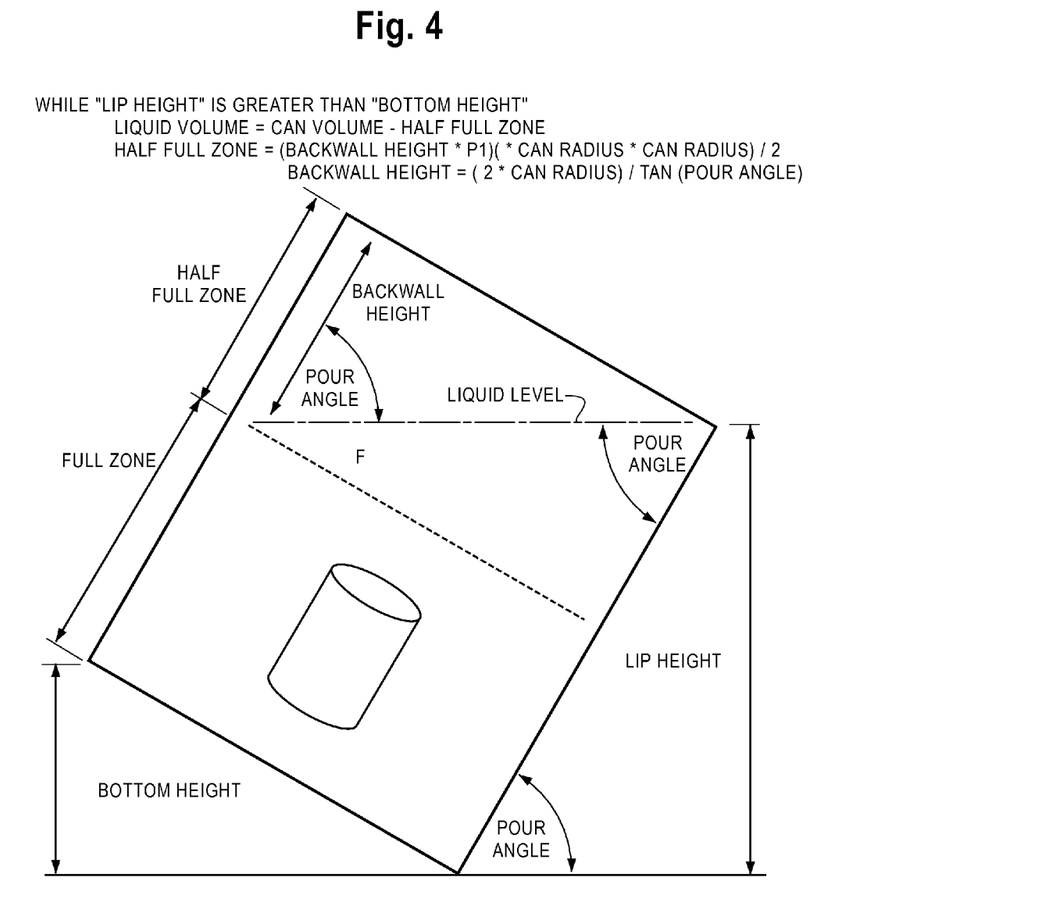
FIG. 4 depicts a 2-dimensional schematic diagram for calculation of the volume of fluid in a container having a cylindrical shape.

The accuracy of volume calculations depends on the accuracy of the angle of tilt/tip being measured. Additionally, the greater the angle of tilt/tip, the more volume of fluid will flow from the container. Accordingly, the accuracy of the measurement of the total volume of fluid poured from a container will depend on the accuracy of the tilt/tip angle measurement and the present angle of tilt/tip for the container. For an open cylinder can having a diameter equal to its height, the calculations will be faster and more accurate, for example, when the container has more fluid present in the container, as illustrated by FIG. 4. The results of volume testing for a cylindrical container having a diameter equal to its height are shown in Table 1 below. Where a container is resting flat (depicted in the table as having a 90.0 degree tilt/tip angle), a change in tilt/tip angle of one degree pours approximately 0.87% of the volume of fluid out of the container. When the container has a tilt/tip angle of 50°, each additional degree of tilt will pour more than 1.5% of the container volume. Thus, where a monitor has an accelerometer accurate to within 1° the accuracy of a measurement of pour for a 16 oz container will be approximately ¼ of an oz. Likewise the accuracy of pour for a 1 gallon container (128 oz) would be approximately 2 oz, and 55 gal container would have a measurement accuracy of approximately 1 gallon, where the container is a cylinder having a diameter equal to its height.

TABLE 1

Calculations assume diameter equals height of container

| Angle degrees | Final Volume % | % Volume Change | % Volume Change of 16 oz can oz | % Volume Change of 128 oz can oz | % Volume Change of 55 gallon gal |
|---|---|---|---|---|---|
| 90.0 | 100% | | | | |
| 89.0 | 99% | 0.87% | 0.14 | 1.12 | 0.48 |
| 80.0 | 91% | 0.90% | 0.14 | 1.15 | 0.49 |
| 79.0 | 90% | 0.90% | 0.14 | 1.16 | 0.50 |
| 70.0 | 82% | 0.98% | 0.16 | 1.26 | 0.54 |
| 69.0 | 81% | 0.99% | 0.16 | 1.27 | 0.55 |
| 60.0 | 71% | 1.15% | 0.18 | 1.47 | 0.63 |
| 59.0 | 70% | 1.18% | 0.19 | 1.50 | 0.65 |
| 50.0 | 58% | 1.47% | 0.23 | 1.88 | 0.81 |
| 49.0 | 57% | 1.51% | 0.24 | 1.93 | 0.83 |
| 48.0 | 55% | 1.56% | 0.25 | 1.99 | 0.86 |
| 47.0 | 53% | 1.61% | 0.26 | 2.06 | 0.88 |
| 46.0 | 52% | 1.66% | 0.27 | 2.12 | 0.91 |
| 45.0 | 50% | 1.72% | 0.27 | 2.20 | 0.94 |

To calculate the fluid pour rates based upon the angle of tilt/tip, the monitor would need information pertaining to certain container property values. At minimum, for a cylindrical container, the monitor would require knowledge of the radius (or diameter) and height of the container. For a non-open top cylinder (i.e., a container having a lid with an opening or a spout for pouring), the monitor would require knowledge of other measurements as well. For example, knowledge of the spout center, or distance from the edge of the container and spout radius would be necessary information to calculate the fluid poured from the container.

Where containers are not cylinders, the monitor would require the dimensions necessary to calculate the internal volume of the container. For example, where a container is a rectangular box, the monitor would require knowledge of the length, width and height of the box, so as to calculate the volume of the box. The information about the dimensions of the container may be entered into the device by a user via the input 280. For example, a user may be prompted for the diameter and height of the container. Alternatively, the user may provide the length, width and height of a container that has a box-type shape.

In certain embodiments, the monitor may provide an interface to the user through an output 250 that interacts with the input 280 to receive information about the container dimensions. For example, a user may scroll through a list of pre-recorded container types, each container type having an associated set of dimensions necessary to calculate the container volume. Thus, a user may scroll through a series of options such as "standard 55-gallon drum," "standard quart of oil," "standard gallon of paint," and select the appropriate container. Where the user selects the standard 55-gallon drum, the container would automatically recognize the dimensions of the container as having a diameter of 22.5 inches (572 mm) and 33.5 inches (850 mm) in height.

In other embodiments, a user may select a container shape from a pre-programmed list of shapes, and then be prompted by the monitor to input the necessary dimensions for the container. For example, where a user selects a container shape as a box-type shape, the monitor may then prompt the user for the length, width and height of the container. Where the user selects a container shape as a covered cylinder, for example, the user may be prompted by the monitor for the diameter (or radius) and height of the container, as well as the size of the spout on the lid of the container, and the coordinates of the spout's location.

Many calculations for the volume of a cylinder involve multiple variable calculus integrals. A computer or a processor, such as the central processor 210, the volume processor 240, or the flow rate processor 240 can be used to evaluate these integrals by means of iterative summing, for example. Iterative summing involves dividing the volume of the container into several small volumes to be counted. The smaller the volumes, the more accurate the results of the iterative summing will be. A table can be generated and programmed into a microcontroller or a processor for ease and acceleration of referencing. Table 2 shows part of a simulation from 43° down to 1°.

TABLE 2

Calculations assume diameter equals height of container

| Angle degrees | Final Volume % | % Volume Change | % Volume Change of 16 oz can oz | % Volume Change of 128 oz can oz | % Volume Change of 55 gallon gal |
|---|---|---|---|---|---|
| 44.0 | 46% | 3.60% | 0.58 | 4.61 | 1.98 |
| 43.0 | 45% | 1.70% | 0.27 | 2.18 | 0.94 |
| 42.0 | 43% | 1.69% | 0.27 | 2.16 | 0.93 |
| 41.0 | 41% | 1.68% | 0.27 | 2.14 | 0.92 |
| 40.0 | 40% | 1.65% | 0.26 | 2.12 | 0.91 |
| 31.0 | 26% | 1.38% | 0.22 | 1.77 | 0.76 |
| 30.0 | 25% | 1.34% | 0.21 | 1.72 | 0.74 |
| 21.0 | 14% | 1.05% | 0.17 | 1.34 | 0.58 |
| 20.0 | 13% | 1.01% | 0.16 | 1.30 | 0.56 |
| 11.0 | 6% | 0.73% | 0.12 | 0.94 | 0.40 |
| 10.0 | 5% | 0.70% | 0.11 | 0.90 | 0.39 |
| 2.0 | 0% | 0.37% | 0.06 | 0.48 | 0.20 |
| 1.0 | 0% | 0.29% | 0.05 | 0.37 | 0.16 |

Figure 5:
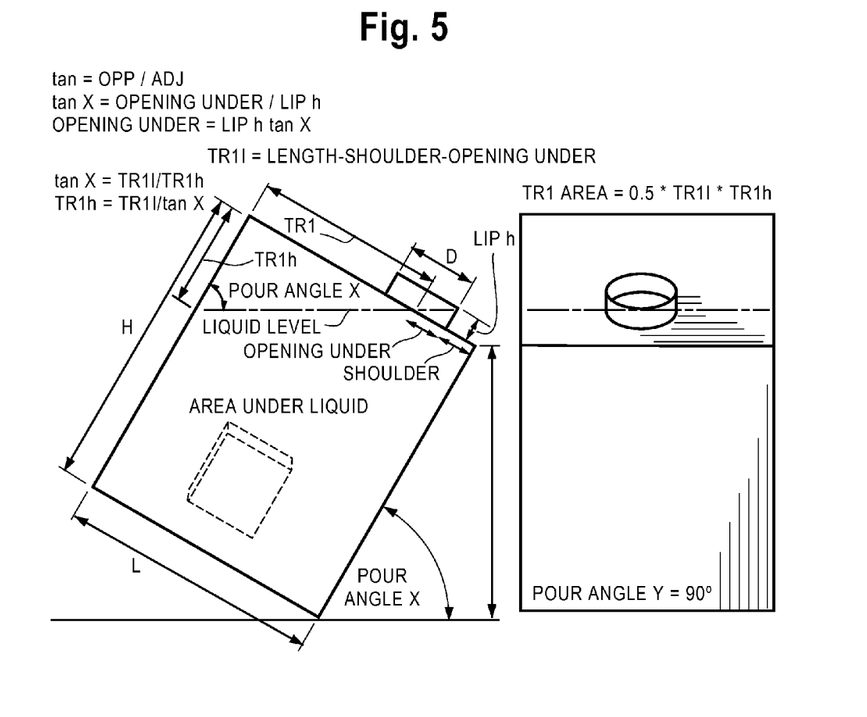
FIG. 5 depicts a 2-dimensional schematic diagram for calculation of the volume of fluid in a container having a box-type shape.
Figure 6:
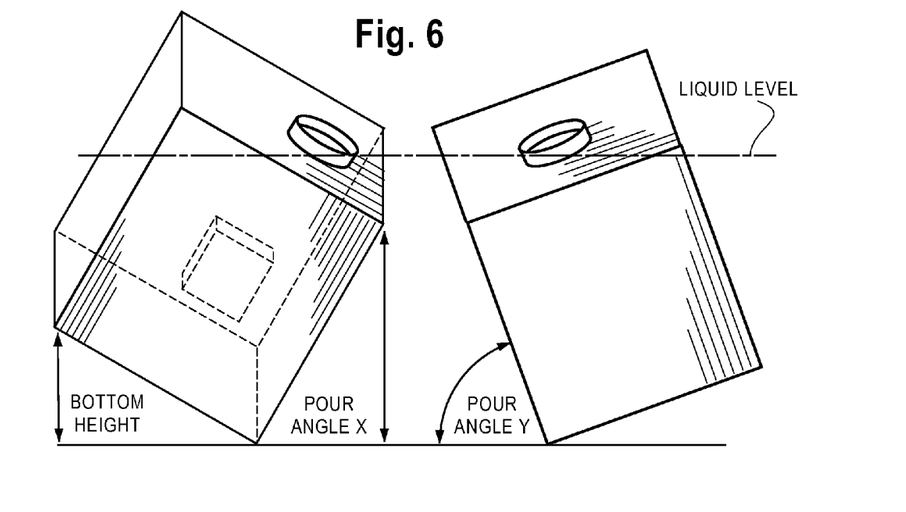
FIG. 6 depicts a 3-dimensional schematic diagram for calculation of the volume of fluid in a container having a box-type shape.

The volume of fluid in a rectangular, or box-type container is depicted in FIGS. 5 and 6. Where the container is tilted/tipped only along one axis, the volume may be found by determining the areas of the sides of the container under the liquid level, and multiplied by the width of the container. From this view, as depicted in FIG. 5, the dimensions necessary to calculate the areas are found using simple calculations using the length (L) and height (H) of the container, as well as the distance of the opening from the container edge and the height and size of the opening (D).

The calculation of volume in the container is achieved differently if the tilting/tipping occurs in more than one direction, as shown in FIG. 6. This may be achieved using iterative summing or other means known by those of ordinary skill in the art.

Referring again to FIG. 2, a flow rate processor 230 calculates the rate of flow of fluid poured from the container. The flow rate processor uses the angle of tilt/tip of the container, the container property values, the fluid property values, and the present volume of fluid in the container. The present volume of fluid in the container is calculated by a volume processor 240. Because the rate of flow of fluid from the container is dependent on the volume of fluid in the container, and the volume of fluid in the container is dependent on the rate of fluid flowing from the container, the volume processor 240 and the flow rate processor 230 are operating continuously, and in conjunction with one another. For example, as the amount of fluid in the container decreases at a particular angle of tilt/tip, the rate of flow of fluid poured from the container will also decrease. However, as fluid is poured from the container, the volume of fluid in the container is continuously decreasing. Accordingly, the central processor 210 regulates the interaction of the volume processor 240 with the flow rate processor 230.

In certain embodiments, the central processor 210 provides real-time monitoring of the interaction between the components of the monitor 200. For example, central processor 210 may provide real-time monitoring of the interaction between at least two of: the flow rate processor 230; the volume processor 240; the fluid property processor 270; the container property processor 260; the accelerometer 220; and the temperature gauge 290. The real-time monitoring allows the central processor to dynamically calculate the flow rate of fluid poured from the container and the present volume of fluid poured from, or remaining in the container, by continuously monitoring the flow rate and volume of fluid based on the changing values of flow rate, volume of fluid, and fluid and container property values.

The flow rate processor 230 calculates the rate of flow of fluid poured from the container based upon the angle of tilt/tip of the container, the fluid property values, the container property values, and the present volume of fluid in the container. In certain embodiments, the flow rate processor measures the rate of flow of fluid out of the container based only on the angle of tilt/tip of the container and the length of time. For example, the flow rate processor may calculate the rate of flow of fluid based upon a model provide for a particular type of fluid and a particular type of container.

When modeling is provided for a particular fluid and a particular container, one or more equations or one or more algorithms (e.g., container volume=$-77.233x^4+172.16x^3-91.315x^2+29.615x+18.756$, where x is the rate of flow of fluid from the container at one angle of tilt/tip) may be generated by testing pour rates at various tilt/tip angles and rates of flow. The equations and/or algorythms may be generated by experimentation where the rate of flow of fluid out of a container is measured based on the angle of tilt/tip of the device. The description of such an experiment is described below.

Figure 7:
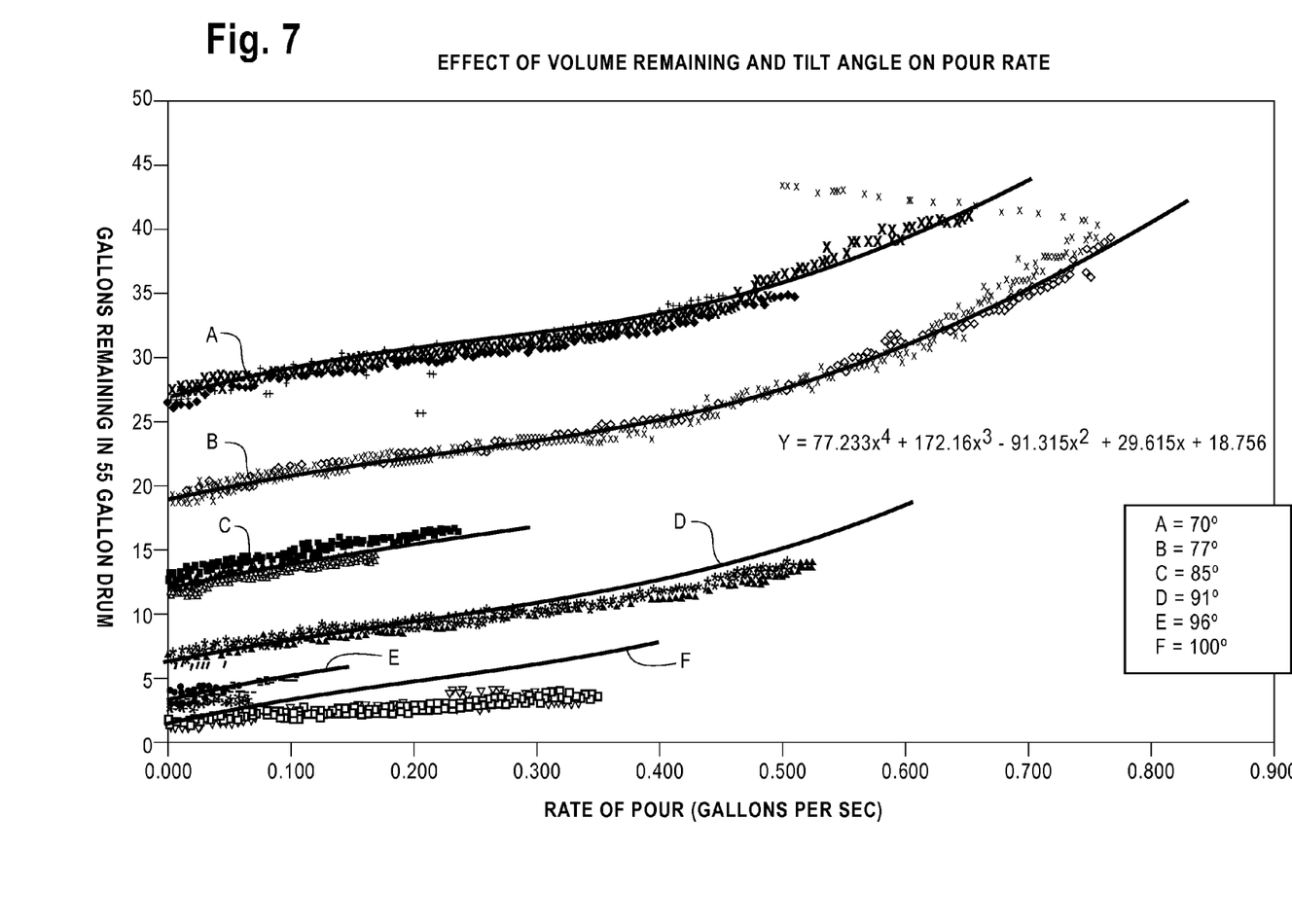
FIG. 7 depicts a graph showing the relationship of flow rate to volume of fluid in a container for a variety of tilt angles using water as a fluid and a 55-gallon drum as a container.

The flow rate for both water and oil were measured when poured from a 55 gallon drum. The results were used to create a model for reporting volume of fluid poured based on the angle of tilt of a 55 gallon drum and time. The model for water poured from a 55-gallon drum is depicted by the graph of FIG. 7. The results of the testing showed that a series of equations and/or algorithms would be able to measure the flow rates for a particular fluid poured from a particular container. A single device could therefore be programmed to operate over a range of fluids having various viscosities, densities and other fluid properties, where those fluid properties were known or generated, for example, by a fluid property processor 270. The device could also operate over a range of containers, where the container properties were known and/or programmed/pre-programmed by the measurement device of the present technology.

The model was created using a testing procedure involving the following steps:
  Step 1) The container was filled to the top with fluid.
  Step 2) The container was tilted, or tipped, to a particular angle (angle A), and the angle was recorded.
  Step 3) The volume of fluid in the container and the flow rate of fluid out of the container were measured and recorded until the fluid flow stopped. This was done by recording the poured fluid weight with a time stamp and deriving the pouring rate from the recorded volume and time data.

Step 4) The container was stood upright, and refilled with fluid.

Step 5) The container was then tilted/tipped to another particular angle different from the previous angle (angle B) and steps 3 and 4 were repeated Step 6) Steps 3, 4 and 5 were continuously repeated until results were recorded for six different angles (see angles A, B, C, D, E and F of FIG. 7)

Step 7) The flow rate data was plotted against the volume of fluid in the container data, as shown in FIG. 7 for each of the six measured angles.

Step 8) Repeat steps 1 through 7 for other fluids having various fluid property values (determined by temperature, pressure, etc).

During the experiment yielding the model depicted by the graph of FIG. 7, fluid was poured from a 55 gallon drum mounted with an accelerometer, and poured into a barrel supported by load cells to measure the weight of the fluid poured. From this measured data, the pour rate was calculated and graphed against volume of fluid remaining in the container for various angles of pour. In other words, at a particular tilt/tip angle (e.g., 77°), the rate of flow of fluid out of the container was measured and charted against the volume of fluid remaining in the container. FIG. 7 depicts the results of the data. In FIG. 7, a curve was extrapolated based upon the data for each of a series of tests performed at a given angle of tilt/tip. For a tilt/tip angle of 77° (see angle α of FIG. 1 for the tilt/tip angle), the flow rate can be derived from the following equation:

$$y = -77.233x^4 + 172.16x^3 - 91.315x^2 + 29.615x + 18.756 \quad \text{Flow Rate Equation 1}$$

Where y represents the volume of fluid in the container, and x is the rate of flow of fluid poured from the container. At different angle of tilt/tip, the equation may change, however, for a particular fluid type it is possible that the equation can remain the same for a variety of tilt/tip angles, perhaps only varying by an offset. By performing the testing and modeling as described, an equation or series of equations can be generated such that, at a particular angle of tilt/tip, the fluid flow rate x can be calculated as a function of the volume of fluid remaining in the drum. Accordingly, the monitor may apply a different equation or algorithm each time the accelerometer detects a change in tilt/tip of the monitor so that the appropriate equation is generating the rate of flow, the new equation based upon data obtained from similar testing done at a new angle of pour.

As shown in FIG. 7, the flow rate equation for a tilt/tip angle of 70° is different from the Flow Rate Equation 1 for a tilt/tip angle of 77°. However, the juxtaposition of the Flow Rate Equation 1 curve over the data points for the testing done at 70° shows that the equation at 70° would vary only by an offset (i.e., only the 18.756 value in the equation would be significantly changed). Thus, in certain embodiments, the equations or algorithms used by the monitor may be scalable over a particular tilt/tip angle range.

Figure 8:
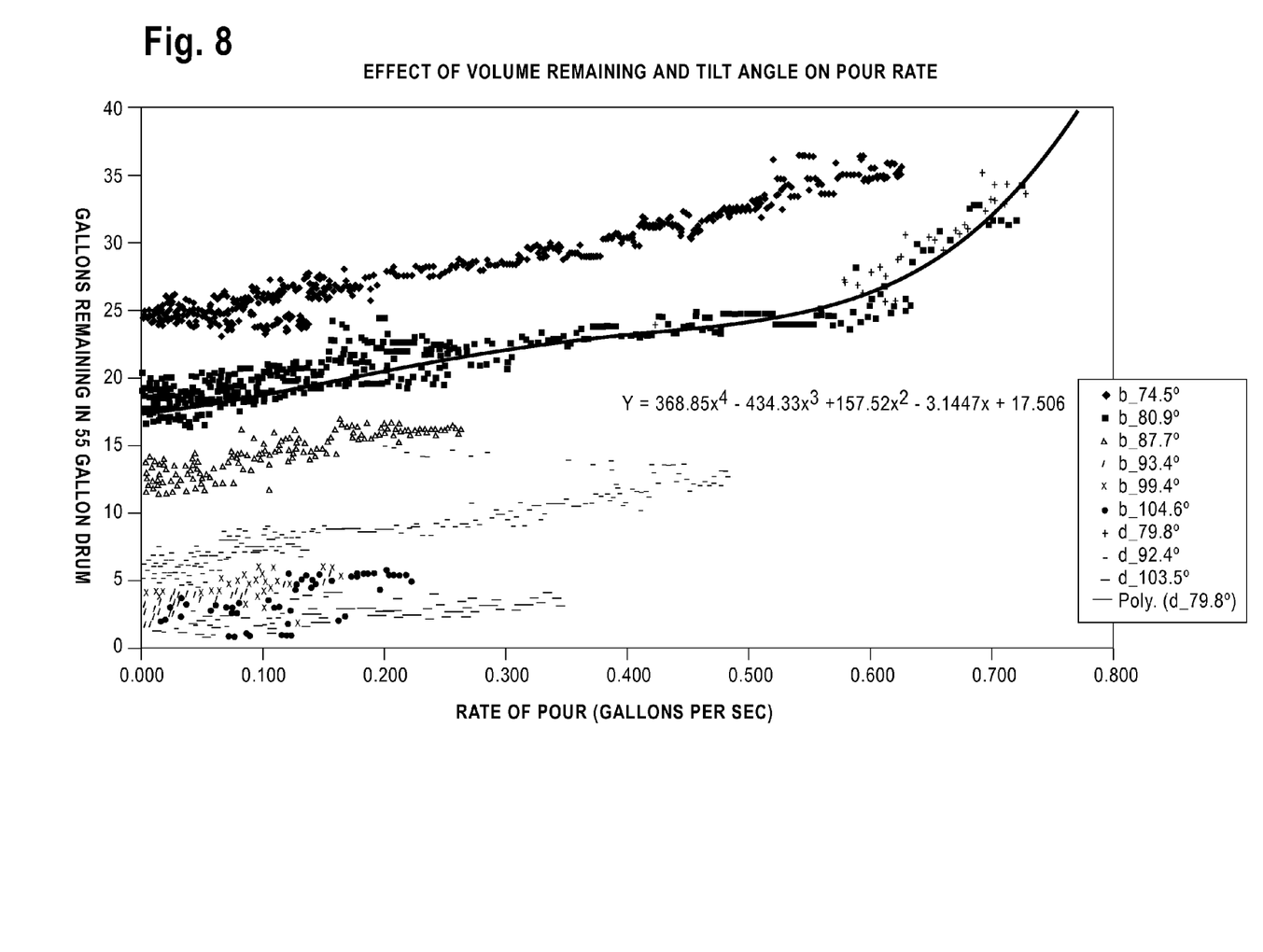
FIG. 8 depicts a graph showing the relationship of flow rate to volume of fluid in a container for a variety of tilt angles using oil as a fluid and a 55-gallon drum as a container.

FIG. 8 depicts the results from a second experiment performed using the same procedure to obtain the results of FIG. 7, this time using oil poured from a 55-gallon drum instead of water. Because the fluid of oil has different fluid property values than water, the results of the pour rates yielded different results. For a tilt/tip angle of 79.8 degrees, the data yielded the following equation $$y = 368.85x^4 - 434.33x^3 + 157.52x^2 - 3.1447x + 17.506 \quad \text{Flow Rate Equation 2}$$

Where y represents the volume of fluid in the container, and x is the rate of flow of fluid poured from the container. Given an initial volume of fluid, the monitor may calculate the flow rate (x) from the above equations from the known volume. Thus, given the amount of oil in the container and the present tilt/tip angle, the flow rate processor may calculate the present flow rate of oil out of the container, and the volume processor can thus continuously calculate the present volume of fluid in the container. The central processor may regulate the interaction of the two processors to ensure dynamic calculation of flow rate and volumes as the tilt/tip angle of the container changes with time.

Thus, modeling can be performed for any fluid and/or any container and implemented into a monitor. In certain embodiments, the monitor may provide a learning mode, where the flow rates can be calculated for a new fluid and/or container. For example, a user may obtain testing data from experiments that yield equations for rates of flow at given angles for a particular fluid and a particular container type. The user may upload the testing data into the monitor via an input or other uploading means, and instruct the monitor to apply the new data as rules when the appropriate fluid and container are used.

For example, testing may be performed by a third party to record the appropriate equations or tables of flow rates for a particular type of fluid and a particular container. The third party may make this information available, for uploading into a monitor by posting the data or the software instructions necessary to operate the monitor over the Internet, for example. The user may then input this test data into the monitor through an input on the measurement device of the present technology.

In certain embodiments, the processor may not be able to operate fast enough to continuously calculate the value of flow rate (x) from a quadratic equation for the flow rate, such as the Flow Rate Equations identified above. Accordingly, in certain embodiments, the monitor may comprise a plurality of processors and/or central processors to more rapidly and accurately generate flow rate values. Alternatively, the processor may be pre-programmed with a look-up table of approximate values for the flow rate based upon an angle of tilt/tip and present volume of fluid in the container. For example, the flow rate processor may involve a look-up routine that references a matrix of data to obtain an approximate flow-rate based on the various factors provided by the monitor, such as fluid property values, container property values, angle of tilt/tip and present volume of fluid. Where the equations are too difficult for the processors of the monitor to timely calculate, the reference table can provide a quicker solution by allowing for approximate referencing.

As discussed, there are several ways in which a user may operate a volumetric flow monitoring device in accordance with the presently described technology. An example mode of operation in accordance with at least one embodiment of the present technology will now be described. First, a user may check with the monitor manual to confirm the product is correctly configured for the fluid type being poured, and the container type holding the fluid. If the monitor is not configured to operate with the fluid and/or the container the user may input the necessary information into the monitor. For example, the user may obtain data from a data source that provides the monitor with the information necessary to operate with the fluid and/or the container of intended use, and transmit that data through an input into the monitor. Alternatively, the user may enter the necessary information in manually through the use of an input device on the monitor.

Where the monitor is configured for operation with the fluid and container type desired, the user may need to instruct the monitor of the fluid and container types. For example, a monitor may be operable with a variety of fluid and container types, and a user may need to select the fluid and/or container types via an input on the monitor from a list of fluid and/or container types that with which the monitor is configured to operate.

Once the monitor is configured to operate with the appropriate fluid and container types, a user can then attach the monitor to the container from which the fluid will be poured. In certain embodiments, the monitor should be attached to the container about the axis with which the container will be poured, so that the angle of tilt/tip detected by the accelerometer of the monitor is the same as the tilt/tip angle of the container. In certain embodiments, a plurality of monitors may be attached to the container and networked together such that the container may be tilted/tipped at any angle, and the plurality of monitors, each having at least one accelerometer, may determine the appropriate tilt/tip angle of the container from which fluid is being poured.

Next, the user instructs the monitor of the initial volume of fluid within the container. In certain embodiments, where the initial volume is known, the user may enter the information into the monitor directly, via an input. Where the initial fluid volume is not known, the user must calibrate the monitor with the initial volume. For example, the user may tilt/tip the container to the point where fluid begins to flow from the container and instruct the monitor to note the angle of tilt/tip. Based on the angle of tilt/tip where fluid begins to flow and using the container property values, a calibration processor can calculate the initial volume of fluid in the container.

Next, the container is returned to rest and the fluid is given proper time to settle. The container may then be tilted/tipped as necessary to pour fluid from the container. An output, such as a display screen or a remotely controlled display reports the amount of fluid poured from the container. Alternatively, the display may report the amount of fluid remaining in the container, the present flow rate of fluid from the container, the ambient temperature or any of the other values used by the monitor in calculating the volume of fluid poured. When the container is returned to an upright position, or to a tilt/tip angle at which fluid no longer pours from the container, the monitor may be manipulated by a user to obtain any desired information regarding the fluid in the container.

A study was conducted using a 55 gallon drum and various small (less than 5 gallon) containers with various fluids such as water, oil and paint. The study noted that the accuracy of the fluid calculations is directly dependent on the accuracy of the container parameters to modeled form. For example, for a rectangular container, not only is length, width, and height of the container vital, but also the dimensions on any rounded edges and the location and sizes of openings. Likewise for a cylinder container, any non cylinder properties left unmeasured can affect the accuracy of the container volume. The volume calculations from the measurements are often nontrivial, especially for cylinders and for rectangular containers tilted/tipped in two directions at once; this affects the speed to produce the calculations and accuracy. Containers with flimsy sides may also limit the accuracy, since when full they will bulge out and vice versa when empty. The study concluded that the larger flow rates resulting from the use of fluids that are less viscous are affected less by surface tension than are fluids with higher viscosities. Accordingly, the accuracy of the calculations is greater when using fluids that have lower viscosity, and containers that have higher rigidity.

The present technology has now been described in such full, clear, concise and exact terms as to enable any person skilled in the art to which it pertains, to practice the same. It is to be understood that the foregoing describes preferred embodiments and examples of the present technology and that modifications may be made therein without departing from the spirit or scope of the invention as set forth in the claims. Moreover, while particular elements, embodiments and applications of the present technology have been shown and described, it will be understood, of course, that the present technology is not limited thereto since modifications can be made by those skilled in the art without departing from the scope of the present disclosure, particularly in light of the foregoing teachings and appended claims. Moreover, it is also understood that the embodiments shown in the drawings; if any, and as described above are merely for illustrative purposes and not intended to limit the scope of the invention, which is defined by the following claims as interpreted according to the principles of patent law, including the Doctrine of Equivalents. Further, all references cited herein are incorporated in their entirety.

The invention claimed is:

1. A volumetric measurement device for monitoring the volume of fluid within a container, said volumetric measurement device comprising:
   a) at least one accelerometer adapted to detect the angle of tilt of the container;
   b) a flow-rate processor adapted to calculate a flow rate value of the fluid poured from the container;
   c) a volume processor adapted to calculate the volume of the fluid within the container;
   d) a fluid property processor adapted to provide at least one fluidic property value of a fluid stored in said container,
   e) a calibration processor adapted to determine an initial volume of fluid within the container; and
   f) a central processor adapted to monitor the interaction between the accelerometer, the flow-rate processor and the volume processor;
wherein said volumetric measurement device is configured for attachment to the container, and further wherein the flow-rate processor is adapted to calculate the rate of flow of the fluid poured from the container based at least in part on the angle of tilt of the container, the at least one fluidic property value of the fluid within the container, and the volume of fluid within the container.

2. The volumetric measurement device of claim 1, wherein said volumetric measurement device is adapted for attachment to the container about the tipping axis of said container.

3. The volumetric measurement device of claim 1, further comprising a display showing a value for the volume of fluid transferred from, or remaining in, the container.

4. The volumetric measurement device of claim 1, wherein the at least one fluidic property value provided by the fluid property processor includes at least one of dynamic viscosity, kinematic viscosity, fluid density or fluid specific gravity measurement, or a combination thereof.

5. The volumetric measurement device of claim 1, further comprising an input device adapted to allow a user to enter information pertaining to at least one fluidic property value.

6. The volumetric measurement device of claim 5, wherein the input device is adapted to allow the user to select a fluid type from a list of pre-stored fluid types, each fluid type having at least one pre-assigned fluid property value.

7. The volumetric measurement device of claim 5, wherein the list of pre-stored fluid types comprises at least one of water, oil, a water-oil emulsion, gasoline, brake fluid, paint, milk, salt or honey.

8. The volumetric measurement device of claim 1, further comprising a container processor adapted to provide at least one container property value corresponding to the container, wherein the flow-rate processor is adapted to calculate the rate of flow of the fluid poured from the container based further on the container property value.

9. The volumetric measurement device of claim 8, further comprising an input device adapted to allow a user to enter information pertaining to at least one container property value.

10. The volumetric measurement device of claim 9, wherein the input device is adapted to allow the user to select a container type from a list of pre-stored container types, each container type having at least one pre-assigned container property value.

11. The volumetric measurement device of claim 1, wherein said calibration processor comprises an input device adapted to allow a user to enter the initial volume of fluid in the container.

12. The volumetric measurement device of claim 1, further comprising a temperature gauge adapted to monitor the ambient temperature, wherein the at least one fluidic property value is based on the ambient temperature.

13. The volumetric measurement device of claim 1, wherein, when said container is tipped for pouring, said flow-rate processor continuously calculates the flow rate value of the fluid poured from the container and said volume processor continuously calculates the volume of the fluid within the container.

14. The volumetric measurement device of claim 10, wherein wherein the list of pre-stored container types comprises at least one of a standard 55-gallon drum, a standard sized can of paint, a standard one-gallon milk jug, a five-gallon bucket, a ten gallon bucket or a twenty gallon barrel.

15. A method for measuring the volume of fluid poured from a container comprising the steps of:
  a) determining the initial volume of fluid in container;
  b) attaching an accelerometer to the container at a location about a tipping axis of the container;
  c) tilting the container along the tipping axis;
  d) measuring the angle of tilt of the container using said accelerometer;
  e) monitoring the duration of the pour;
  f) calculating the rate of flow of fluid poured from the container with a processor, wherein said rate of flow is determined based at least in part on
    i) the measured angle of tilt; and
    ii) the determined initial volume of fluid in the container;
  g) calculating a present volume of fluid remaining in the container with a processor based at least in part on the determined initial volume, the calculated rate of flow and the monitored duration of pour; and
  h) updating the rate of flow and the present volume of fluid in the container.

16. The method of claim 15, further comprising monitoring the ambient temperature with a temperature gage, and further wherein the flow rate of fluid poured from the container is based at least in part on the measured ambient temperature.

17. The method of claim 15, further comprising the step of inputting data into the monitor to calculate flow rate of fluid poured from the container based upon the data inputted.

18. The method of claim 15, wherein determining the initial volume measurement comprises the steps of:
  i) tilting the container to a point at which fluid begins to pour from the container;
  ii) recording the initial pouring angle of tilt where fluid begins to pour from the container;
  iii) calculating the initial volume based upon the physical dimensions of the container and the initial pouring angle of tilt.

19. A fluid storage system for monitoring the volume of fluid in a container, the system comprising:
  a) a container capable of storing a fluid;
  b) at least one pouring monitor comprising:
    i) at least one accelerometer adapted to detect the angle of tilt of the container;
    ii) at least one fluid property processor adapted to provide at least one fluidic property value of a fluid stored in said container,
    iii) at least one flow-rate processor adapted to calculate a flow rate value of the fluid poured from the container;
    iv) at least one volume processor adapted to calculate the volume of the fluid within the container;
    v) at least one calibration processor adapted to determine an initial volume of fluid within the container; and
    vi) at least one central processor adapted to monitor the interaction between the accelerometer, the flow-rate processor and the volume processor;
wherein the flow-rate processor is adapted to calculate the rate of flow of the fluid poured from the container based at least in part on the angle of tilt of the container, the at least one fluidic property value of the fluid within the container, and the volume of fluid within the container.

20. The fluid storage system of claim 19, wherein the shape of said container is at least one of a box, a cube, a sphere, a cone, an ovoid, a prism, or a pyramid.

* * * * *